though this invention does not relate to olefin feeds below hexenes. On page 9 of the aforesaid book "Higher Oxo Alcohols," it will be noted that a typical type V olefin, i.e. 2,4,4-trimethyl-2-pentene is essentially unreactive compared to the other olefin types. A typical type IV olefin reacts over twice as fast as the type V olefin. With regard to alkylation reactions, types I–IV are generally more reactive than the type V noted above.

3,214,487
CONVERSION OF INACTIVE OLEFINS

William Judson Mattox, Baton Rouge, La., assignor to Esso Research and Engineering Company, a corporation of Delaware
No Drawing. Filed Oct. 28, 1963, Ser. No. 319,542
9 Claims. (Cl. 260—683.2)

This application is a continuation-in-part of application Serial No. 69,831, filed November 17, 1960, which is a continuation of application Serial No. 765,743, filed on October 7, 1958, both of which are abandoned.

This invention relates to the selective conversion of type V olefins to more active olefins having the same molecular weight. More particularly, this invention relates to a process for converting type V olefins to more active olefins which comprises contacting the type V olefins with certain metal alumino silicates, i.e. alkali alumino silicates. More particularly, this invention relates to the conversion of $C_6$–$C_{30}$ type V olefins to olefins having at least one active hydrogen atom attached to at least one of the double bond carbon atoms.

It is well known that olefins may be categorized by type in accordance with their structure and location of the double bond carbon atoms. The following list identifies the various types of olefins and places them in established classifications.

Olefin type: | Formula
---|---
I | (R—CH=$CH_2$)
II | (R—CH=CH—R)
III | ($R_2C$=$CH_2$)
IV | ($R_2C$=CH—R)
V | ($R_2C$=$CR_2$)

It will be noted that type I olefins contain three hydrogen atoms attached to the double bond carbon atoms and are generally the most reactive. The term "double bond carbon atom" is employed herein to mean any carbon atom attached to another carbon atom through a double bond. Type II olefins which have an internal double bond, i.e. non alpha, contain one hydrogen atom attached to each double bond carbon atom and are generally somewhat less reactive than type I olefins. The least active olefins are the type V compounds which contain essentially no active hydrogen atoms, i.e. no hydrogen atoms attached to the double bond carbon atoms. It is the type V olefins with which this invention is concerned.

In many processes a mixture of olefins is employed as a feed stock to obtain valuable products. Among these processes is included the carbonylation or oxo reaction wherein an olefin is converted to an aldehyde having one more carbon atom than the starting olefin. This reaction is usually carried out by contacting the desired olefin with carbon monoxide and hydrogen at elevated temperatures and pressures in the presence of a Group VIII metal catalyst for a time sufficient to add a formyl group to the olefin. Essentially all of the types noted above react in the oxo or carbonylation process at reasonable rates with exception of the type V olefins.

Another process which in many cases employs mixed olefins involves the alkylation of aromatic compounds such as benzene, toluene or the like for the production of alkyl aromatics which in turn may be converted to alkyl aryl sulfonates, well-known detergents. This reaction also requires for the greatest conversion, available hydrogen atoms on the double bond carbon atoms. It is the purpose of this invention to convert relatively inactive olefin feeds to active olefinic feeds for the above and other processes by a simple and inexpensive technique.

A more complete description of one of the above prior art processes will now be given. The oxo process involves reacting a $C_3$–$C_{30}$ olefin with carbon monoxide and hydrogen in 1:4 to 4:1 mol ratio at temperatures of 150°–500° F. in the presence of 0.01 to 2% Group VIII metal catalysts. More particularly the oxo catalyst generally employed will comprise a cobalt compound such as a fatty acid salt of cobalt, e.g. cobalt oleate, cobalt naphthenate, cobalt stearate, cobalt acetate, or an inorganic salt including cobalt chloride, cobalt nitrate and the like. Also, there may be employed cobalt carbonyl which may be preformed by reacting a cobalt compound with carbon monoxide at oxo temperatures and pressures. The product mixture from the oxo reaction contains an aldehyde having one more carbon atom than the starting olefin as well as other products such as a corresponding alcohol and dimer compounds. The aldehyde, if desired, may be converted to the alcohol by a conventional hydrogenation technique and further, if desired, the cobalt catalyst may be removed from the reaction mixture prior to hydrogenation by known decobalting processes which involve, for example, the use of steam and elevated temperatures. The oxo process is, of course, well known in the art and for a more complete description of this process, reference may be had to the book entitled "Higher Oxo Alcohols," by Dr. Lewis F. Hatch, published by Enjay Co., New York. Since there are no type V olefins having less than six carbon atoms, this invention does not relate to olefin feeds below hexenes. On page 9 of the aforesaid book "Higher Oxo Alcohols," it will be noted that a typical type V olefin, i.e. 2,4,4-trimethyl-2-pentene is essentially unreactive compared to the other olefin types. A typical type IV olefin reacts over twice as fast as the type V olefin. With regard to alkylation reactions, types I–IV are generally more reactive than the type V noted above.

It has now been found that a type V $C_6$–$C_{30}$ olefin and preferably a $C_7$ to $C_{20}$ olefin may be contacted in liquid or vapor phase with a substantially anhydrous alkali alumino silicate, i.e., an inorganic zeolite, at temperatures of 350° to 525° F. and pressures of 0 to 500 p.s.i.g. to selectively convert them to other more active types without substantial loss of olefin feed. The temperature employed will vary in accordance with the molecular weight of the olefin and care should be taken to avoid excessive temperatures which may cause substantial cracking. The alkali alumino silicates employable in accordance with this invention may be natural or synthetic; crystalline or amorphous zeolites which have been dehydrated as by heating to about 300 to 650° F., preferably about 400–450° F. for a sufficient period to drive off substantially all of the the water of hydration without substantially altering the structure or crystal form of said zeolites. Typical natural alkali alumino silicates coming within the scope of this invention include:

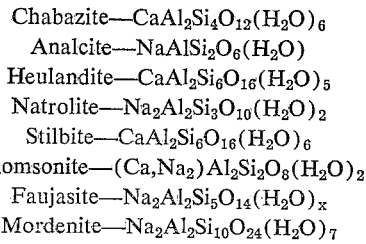

Permutite, $Al_2Na_2H_6Si_2O_8$, is an example of a well-known synthetic inorganic zeolite. Other alkali metal or alkaline earth metal permutites, e.g. calcium, magnesium and potassium, may be employed in lieu of the sodium form. Other amorphous type natural or synthetic alumino silicates may also be employed.

The synthetic crystalline zeolites include the now well-known alkali alumino silicates generally referred to as "molecular sieves," i.e. 4 A., 5 A. and 13 A., the numbers referring to the pore size. There are numerous types of synthetic crystalline zeolites which differ in chemical formula and structure, i.e. pore size; however, most of these zeolites generally contain silicon, aluminum, oxygen and an alkali or alkaline earth element, e.g. sodium and/or calcium, magnesium, etc. present as $MeO \cdot SiO_2 \cdot Al_2O_3$. Water of hydration usually present in these molecular sieves is driven off before use by heating to elevated temperatures but preferably below about 550° F. These synthetic crystalline zeolites referred to as molecular sieves are well known in the art. However, for a more complete description of the structure and method of preparation, reference may be had to Barrer, U.S. 2,306,610, which teaches a molecular sieve having the formula $(Ca, Na_2)Al_2Si_4O_{12} \cdot 2H_2O$. Also reference may be had to Black U.S. 2,522,426, which describes the synthetic molecular sieve having the formula $4CaO \cdot Al_2O_3 \cdot 4SiO_2$.

The olefins employed herein as the type V containing feeds may be derived from various sources. A particularly attractive method for preparing $C_6$-$C_{30}$ olefins from lower molecular weight olefins such as propylene include the polymerization of propylene by contact with a phosphoric acid catalyst at elevated temperatures and pressures. By this polymerization technique there is obtained a mixture of $C_6$ and higher olefins which may be fractionated into $C_7$, $C_9$, $C_{12}$ or any fraction desired. The $C_9$ and $C_{12}$ polymers are typically referred to as tri- and tetrapropylene and are well-known feed stocks for both the oxo and alkylation processes. A typical olefin type distribution from the polymerization of propylene with phosphoric acid catalysis appears in the following table.

TYPICAL PROPYLENE TETRAMER

| $C_{12}$ Fraction Olefin Type | Specific Volume Percent | Range in Vol. Percent |
|---|---|---|
| I ($R-CH=CH_2$) | 0 | 0 to 5 |
| II ($R-CH=CH-R$) | 1 | 0 to 10 |
| III ($R_2C=CH_2$) | 0 | 0 to 10 |
| IV ($R_2C=CH-R$) | 8 | 5 to 35 |
| V ($R_2C=CR_2$) | 91 | 65 to 95 |

It will be noted that the above specific propylene tetramer contains over 90% type V olefin and as a result makes a very poor feed stock for the oxo and alkylation processes.

In accordance with one embodiment of this invention, a type V olefin-containing stream is passed (introduced) in vapor phase through a bed of dehydrated alkali alumino silicate at elevated temperatures of 350° to 525° F. and preferably at feed rates between 0.01 to 2 v./v./hr. The feed rates in accordance with this invention, however, are more preferably between 0.1 to 1 v./v./hr. The higher range of feed rates will, in general, be employed with the lower molecular weight olefins.

For a more complete understanding of this invention, reference is now had to the examples which appear in the following table. In the examples, vaporous $C_{12}$ olefin was passed through a bed of the designated substantially anhydrous solids in a vapor jacketed 600 cc. reactor vessel. The effluent was condensed by cooling to room temperature and then distilled to obtain a bulk cut of the same boiling range as the feed. The indicated yields and analytical data were obtained for this cut.

Table.—Conversion of type V olefins

[Feed: Propylene tetramer from phosphoric acid polymerization. Pressure: Atmospheric]

| Example | 1 | 2 | 3 | 4 | 5 | 6 | 7 | 8 | 9 |
|---|---|---|---|---|---|---|---|---|---|
| Catalyst | None (Feed) | $Na_2O=Al_2O_3$- 2.7 $SiO_2$ 13 A. Sieve | $Na_2O=Al_2O_3=$ 4.5 $SiO_2$ Sodium-Alumino-Silicate | | Silica-Alumina (13% $Al_2O_3$) | | Nonzeolite (86% $SiO_2$— 13% $Al_2O_3$ 1% $Na_2O$) | Silica Gel | Alumina |
| Temperature, ° F | | 450 | | | 400 | | | 450 | |
| Feed Rate, v./v./hr | | 0.2 | 0.1 | | 0.2 | | | | |
| $C_{12}$ Olefin Product: | | | | | | | | | |
| Yield, Percent/Pass* | 100 | 88 | 51 | 100 | 44 | 39 | 52 | 63 | 67 |
| Percent Olefin | 100 | 96 | 93 | 100 | 2 | 3 | 13 | 64 | 61 |
| Olefin Type Analysis: | | | | | | | | | |
| I ($R-CH=CH_2$) | 0 | 1 | 1 | 1 | | | | | |
| II ($R-CH=CH-R$) | 1 | 13 | 10 | 7 | | | | | |
| III ($R_2C=CH_2$) | 0 | 4 | 3 | 4 | | | | | |
| IV ($R_2C=CH-R$) | 8 | 73 | 66 | 73 | | | | | |
| V ($R_2C=CR_2$) | 91 | 10 | 20 | 15 | | | | | |

*Vol. percent yield based on fraction of same boiling range in feed.

In the foregoing table the yield represents the percentage hydrocarbon boiling in the $C_{12}$ range based on the $C_{12}$ olefin feed. The yield percent figures indicate to a certain extent the amount of cracking to lower molecular weight hydrocarbons. Cracking is undesirable for the purposes of the present invention. The percent olefin is an indication of the extent of hydrogen transfer and formation of saturated compounds, also undesirable for purposes of the present invention. It will be noted that the nonzeolites, i.e. silica gel, adsorptive alumina, silica-alumina cogel and silica-alumina cogel containing $Na_2O$ all effected a substantial amount of cracking with considerable loss of $C_{12}$ feed stock. Moreover, as noted by the percent olefin, the nonzeolites effected substantial losses of olefin content presumably by hydrogen transfer and by hydrogenation of the olefins to paraffinic compounds. Both the crystalline zeolite 13 A. molecular sieve and amorphous zeolite sodium alumino silicate effected high yields of $C_{12}$ product per pass with substantially no loss of olefins. Conversion of type V olefin to other more active types was extremely high as noted by the olefin type distribution shown in the table. Thus, the alkali alumino silicates are highly selective for the conversion of type V olefins to more active olefins and will effect this conversion with olefins in the $C_6$-$C_{30}$ range. The tetramer obtained after conversion in accordance with this invention is about twice as reactive in the oxo process as the original tetramer feed stock. From the table it will be noted that the residence time as evidenced by the feed rate must be sufficiently high to avoid substantial cracking. With tetrapropylene feed and a catalyst temperature of 450° F. it is necessary to maintain a feed rate of at least 0.1 v./v./hr. (volume of liquid feed per volume of reactor space per hour). However, the feed rate will vary with the molecular weight of the feed and the temperature employed, the high molecular weight olefins requiring lower temperatures and correspondingly lower feed rates. Higher feed rates up to about 2 v./v./hr. may be employed with the lower molecular weight olefins or with a lesser degree of conversion to the more active olefin types. The reaction vessel may be filled or partially filled with the alkali alumino silicate of this invention.

The following examples demonstrate the use of two other type V containing feeds, i.e., 2,3-dimethyl butene-2 and a $C_{20}$ polymer containing 86% type V olefins.

EXAMPLE 10

Contacting 2,3-dimethyl butene-2 (100% type V olefin) with a fixed bed of substantially anhydrous 13A type sodium alumino silicate (molecular sieve) at 450° F. and 1 v./v./hr. yields a hexane fraction of the following composition:

| Olefin type: | Volume percent |
|---|---|
| I | 0 |
| II | 30 |
| III | 15 |
| IV | 50 |
| V | 5 |

EXAMPLE 11

A $C_{20}$ polymer having a type V olefin content of 86% is contacted with a substantially anhydrous 13A type sodium alumino silicate at 375° F. and a v./v./hr. of 0.05 to yield an olefin product of the same approximate boiling range and with a type V olefin content of only 23%.

What is claimed is:

1. A method for converting a feed olefin the major proportion of which are type V olefins represented by the formula

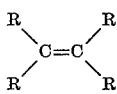

wherein each R is an alkyl group and the total number of carbon atoms in each molecule of the feed olefin is 6 to 30, to more active olefins which comprises introducing said feed olefin in contact with a substantially anhydrous alkali alumino silicate at temperatures of 350–525° F. at feed rates of 0.01 to 2 v./v./hr. until a substantial amount of the feed olefin is converted to olefins of substantially the same number of carbon atoms per molecule which product olefins have at least one active hydrogen atom attached to at least one of the double bond carbon atoms and recovering said converted more active olefins as a product stream.

2. A process in accordance with claim 1 wherein said alkali alumino silicate is amorphous.

3. A process in accordance with claim 1 wherein said alkali alumino silicate is crystalline.

4. A method of converting feed olefins more than 90% of which are type V olefins represented by the formula

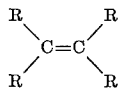

wherein each R is an alkyl group and the total number of carbon atoms in the feed olefins averages about 12, to more active olefins which comprises passing the feed olefins through a bed of substantially anhydrous alkali alumino silicate at a temperature of 350 to 525° F. and at a feed rate in the range of 0.1 to 1 v./v./hr. and recovering the more active product olefins of substantially the same number of carbon atoms per molecule as the feed olefins from the reaction products, said more active product olefins having at least one hydrogen atom attached to at least one of the double bond carbon atoms.

5. A method in accordance with claim 4 wherein the olefins to be converted are a $C_{12}$ fraction from the polymerization of propylene by contact with a phosphoric acid catalyst at elevated temperatures and pressures.

6. A method in accordance with claim 4 wherein said alkali alumino silicate is crystalline sodium alumino silicate.

7. A method in accordance with claim 4 wherein said alkali alumino silicate is amorphous sodium alumino silicate.

8. A method in accordance with claim 4 wherein said alkali alumino silicate is crystalline and contains about 2.7/1 silica alumina mol ratio.

9. A method in accordance with claim 4 wherein said alkali alumino silicate is amorphous and contains about 4.5/1 silica alumina mol ratio.

References Cited by the Examiner

UNITED STATES PATENTS

| 2,217,252 | 10/40 | Hoog | 260—683.2 |
| 2,386,934 | 10/45 | Cramer | 260—683.2 |
| 2,554,251 | 5/51 | Hudson | 260—683.2 |
| 2,988,578 | 6/61 | Fleck et al. | 260—683.9 |
| 3,033,778 | 5/62 | Frilette | 260—683.2 |

ALPHONSO D. SULLIVAN, *Primary Examiner.*